(12) United States Patent
Vantalon et al.

(10) Patent No.: US 7,508,454 B1
(45) Date of Patent: Mar. 24, 2009

(54) DIGITAL TELEVISION CONDITIONAL ACCESS METHODS AND APPARATUS FOR SIMULTANEOUSLY HANDLING MULTIPLE TELEVISION PROGRAMS

(75) Inventors: Luc Vantalon, Sunnyvale, CA (US); Gilles Gautier, Eygalières (FR); Arnaud Boursier, Nans les Pins (FR)

(73) Assignee: SmarDTV SA, Cheseaux-sur-Lausanne (CH)

( * ) Notice: Subject to any disclaimer, the term of this patent is extended or adjusted under 35 U.S.C. 154(b) by 1197 days.

(21) Appl. No.: 09/716,845

(22) Filed: Nov. 16, 2000

(51) Int. Cl.
*H04N 5/14* (2006.01)
*H04N 7/167* (2006.01)
*H04J 3/04* (2006.01)

(52) U.S. Cl. .................. 348/571; 348/385.1; 348/469; 370/535; 370/537; 380/212; 725/31

(58) Field of Classification Search ............. 725/94–96; 370/458, 537, 538, 539, 540, 541, 542, 535; 348/571, 385.1, 723, 725, 469, 489, 565; 380/212

See application file for complete search history.

(56) References Cited

U.S. PATENT DOCUMENTS

| | | | |
|---|---|---|---|
| 4,472,686 A | * | 9/1984 | Nishimura et al. ............. 341/53 |
| 4,891,805 A | * | 1/1990 | Fallin ......................... 370/229 |
| 4,893,306 A | * | 1/1990 | Chao et al. ................... 370/458 |
| 5,212,687 A | * | 5/1993 | De La Bourdonnaye .... 370/538 |
| 6,035,037 A | | 3/2000 | Chaney |

FOREIGN PATENT DOCUMENTS

| EP | 1 022 900 A | 7/2000 |
|---|---|---|
| WO | WO 99 57889 A | 11/1999 |

* cited by examiner

*Primary Examiner*—M. Lee
(74) *Attorney, Agent, or Firm*—Stuart J. Friedman

(57) ABSTRACT

A digital television receiving system having a security mechanism which simultaneously handles two or more separate television program signals is described. The system includes a plurality of digital television receiver mechanisms for receiving a plurality of separate digital television program signal transport streams. The system also includes a multiplexer mechanism coupled to the digital television receiver mechanisms for tagging and multiplexing the received program signal transport streams into a single combined signal transport stream. The combined transport stream is supplied to a security mechanism which limits usable access to the combined stream to authorized users. The system further includes a demultiplexer mechanism for receiving an access-allowed combined transport stream from the security mechanism and demultiplexing the combined transport stream into separate transport streams corresponding to the separate transport streams received by the receiver mechanisms. The system also includes circuitry responsive to at least one of the demultiplexed transport streams for supplying image signals to a television display mechanism for producing television images.

13 Claims, 7 Drawing Sheets

| CHANNEL | UI |
|---|---|
| RECEIVER A | 0x47 |
| RECEIVER B | 0x46 |
| RECEIVER C | 0x45 |
| RECEIVER D | 0x44 |
| RECEIVER E | 0x43 |
| RECEIVER F | 0x42 |
| RECEIVER G | 0x41 |
| RECEIVER H | 0x40 |

DIGITAL TELEVISION CONDITIONAL ACCESS METHODS AND APPARATUS FOR SIMULTANEOUSLY HANDLING MULTIPLE TELEVISION PROGRAMS

CROSS-REFERENCE TO RELATED APPLICATIONS

This application is related to the following copending United States patent applications:

(1) Ser. No. 09/444,488, filed on Nov. 19, 1999, entitled "Digital Television Conditional Access Methods and Apparatus with Multiple Data Transport Mechanism" and invented by Luc Vantalon, Arnaud Chataignier and Christophe Genevois;

(2) Ser. No. 09/444,490, filed on Nov. 19, 1999, entitled "Adaptive Trans-Scrambling Mechanism for Digital Television Multiple Data Transport System" and invented by Luc Vantalon, Arnaud Chataignier and Christophe Genevois;

(3) Ser. No. 09/444,495, filed on Nov. 19, 1999, entitled "Digital Television Conditional Access Methods and Apparatus with Multiple Data Transport Mechanism" and invented by Luc Vantalon, Arnaud Chataignier and Christophe Genevois; and (4) Ser. No. 09/443,173, filed on Nov. 19, 1999, entitled "Signal Filtering Mechanism for a Multi-Purpose Digital Television Receiver" and invented by Luc Vantalon, Arnaud Chataignier and Christophe Genevois.

The foregoing cross-referenced patent applications are expressly incorporated in their entirety into the present patent application by this reference thereto.

TECHNICAL FIELD

This invention relates to methods and apparatus which are useful in digital television systems. While not limited thereto, the invention is particularly useful in digital television receiving systems which employ a set-top control box or the like for controlling access to the television signals.

BACKGROUND OF THE INVENTION

Various methods have been proposed for limiting access to television signals to authorized customers who have made the proper arrangements for payment of the services. A common method is to encrypt the broadcast television signal and require the use of a security mechanism at the receiving end for decrypting or unscrambling the signal, provided the customer has a valid and current account with the service provider. Such a security mechanism may take the form of a set-top control box which is connected to the customer's television set and is activated by a special control code when access is authorized.

A new trend which appears to be emerging is to provide television receivers which are capable of simultaneously handling two or more different television programs. This enables the television set to provide a so-called "picture-in-picture" type display wherein two or more independent television programs are simultaneously displayed on the image screen in separate areas on the screen. The picture of lesser interest could be of smaller size occupying, for example, a corner portion of the image screen. Or one of the pictures could take the form of a program guide listing upcoming television shows.

Another reason for simultaneously receiving multiple television programs would be to record one program while watching another and different program.

Simultaneously handling two or more separate television programs complicates the providing of security mechanisms for controlling access to the programs. A logical solution would be to provide two or more separate security mechanisms, one for each television signal channel. This, however, would be an expensive solution. It would double or more than double the amount of security mechanism hardware needed. The present invention provides a better solution to the problem.

SUMMARY OF THE INVENTION

The present invention provides an efficient and cost-effective method for providing a security mechanism for a television receiver which simultaneously handles two or more separate television program signals. A television receiving system constructed in accordance with the present invention comprises a plurality of television receiver mechanisms for receiving a plurality of separate television program signals. Such system further includes a multiplexer mechanism coupled to the television receiver mechanisms for multiplexing the received program signals into a single combined signal stream. The combined signal stream is then supplied to a singular security mechanism for controlling access to the combined signal stream. The receiving system further includes a demultiplexer mechanism coupled to the security mechanism for receiving an access-allowed combined signal stream and demultiplexing same for producing separate television program signals corresponding to the separate program signals received by the receiver mechanisms. At least one of the demultiplexed separate program signals is supplied to circuitry for supplying image signals to a television display mechanism for producing visible television images. A second of the demultiplexed program signals may also be supplied to the image signal circuitry or, alternatively, may be supplied to a video recording mechanism or some other appropriate utilization mechanism.

As seen from the foregoing, one and the same security mechanism simultaneously handles a plurality of television program signals.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings.

DETAILED DESCRIPTION OF THE ILLUSTRATED EMBODIMENT

Figure 1:
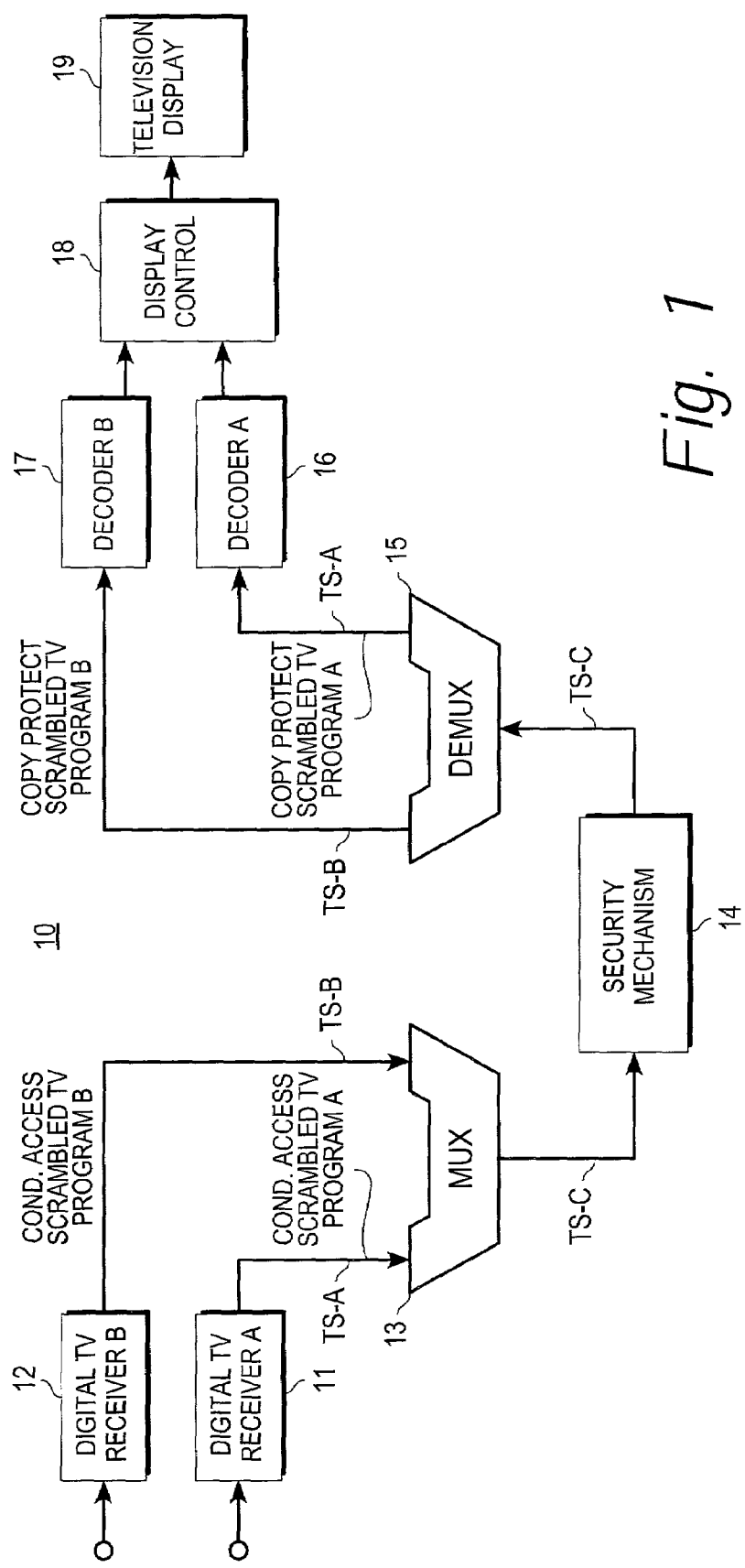
FIG. 1 is a block diagram of a representative embodiment of a digital television receiving system constructed in accordance with the present invention.

Referring to FIG. 1, there is shown a digital television receiving system 10 constructed in accordance with the present invention. System 10 includes digital television receiver mechanisms 11 and 12 for receiving two separate digital television program signal transport streams TS-A and TS-B, respectively. It is assumed for sake of example herein that these signal transport streams TS-A and TS-B are formatted in accordance with the MPEG-2 standard established by the Motion Picture Experts Group. As such, the signals are packetized into data packets of constant size. For MPEG-2, each packet has a length of 188 bytes. It is also assumed that the signals are encrypted or scrambled for security purposes.

The digital television receiving system 10 also includes a multiplexer (MUX) mechanism 13 coupled to the outputs of the digital television receiver mechanisms 11 and 12 for multiplexing the received program signal transport streams TS-A and TS-B into a single combined signal transport stream TS-C.

The combined transport stream TS-C is supplied to a security mechanism 14 which controls access to the combined stream. If the television receiving system 10 has been authorized to receive the programs, the security mechanism 14 will reformat the signals so that they may be properly decoded by the remainder of the system. Otherwise, only unintelligible, scrambled images will be produced on the television display screen. Authorization is accomplished by loading a special control code into the security mechanism 14 by means of, for example, a properly coded smart card.

Appropriate security mechanisms for use in the present system are described in the above cross-referenced related U.S. patent applications. The security mechanisms described therein are referred to as "conditional access modules". They include a copy protect feature for preventing unauthorized copying or recording of received program materials. In particular, the signals appearing at the outputs of receivers 11 and 12 are referred to as conditional access (CA) scrambled signals. The conditional access modules descramble the received signals for general access purposes and then rescramble them into a copy protect (CP) form that cannot be easily descrambled by video recorders presently on the market. Other forms of security mechanisms may, of course, be used. In particular, for less sophisticated types of security mechanisms, the access-allowed signals at the output of the security mechanism 14 may be in unscrambled form.

The receiving system 10 also includes a demultiplexer (DEMUX) mechanism 15 coupled to the security mechanism 14 for receiving an access-allowed combined signal transport stream TS-C and demultiplexing same for producing separate digital television program signal transport streams TS-A and TS-B corresponding to the separate program signal transport streams TS-A and TS-B output by the receiver mechanisms 11 and 12, but including any modifications made by the security mechanism 14. In particular, the demultiplexed transport streams may be in a copy protect scrambled form, as opposed to a conditional access scrambled form.

The receiver system 10 further includes circuitry responsive to the demultiplexed separate digital television program signal transport streams TS-A and TS-B appearing at the outputs of the demultiplexer 15 for supplying image signals to a television display mechanism for enabling same to produce television images. This circuitry includes decoders 16 and 17 for individually decoding the separate transport streams TS-A and TS-B. Each of decoders 16 and 17 converts the video portions of their respective signals from the MPEG-2 format to the conventional video signal form commonly used by video monitors and television displays. Each decoder also decodes and separates any accompanying audio signals and supply them to an appropriate audio system (not shown). If the signal transport streams supplied to decoders 16 and 17 are in scrambled forms, decoders 16 and 17 also function to descramble them to a clear or unscrambled form.

The decoded signals at the outputs of decoders 16 and 17 are supplied to a display control mechanism 18 which, in turn, drives a television display 19 which produces the visual television images. In the FIG. 1 embodiment, both video signals are supplied to the display control mechanism 18 for purposes of producing a "picture-in-picture" type display on display 19.

Figure 2:
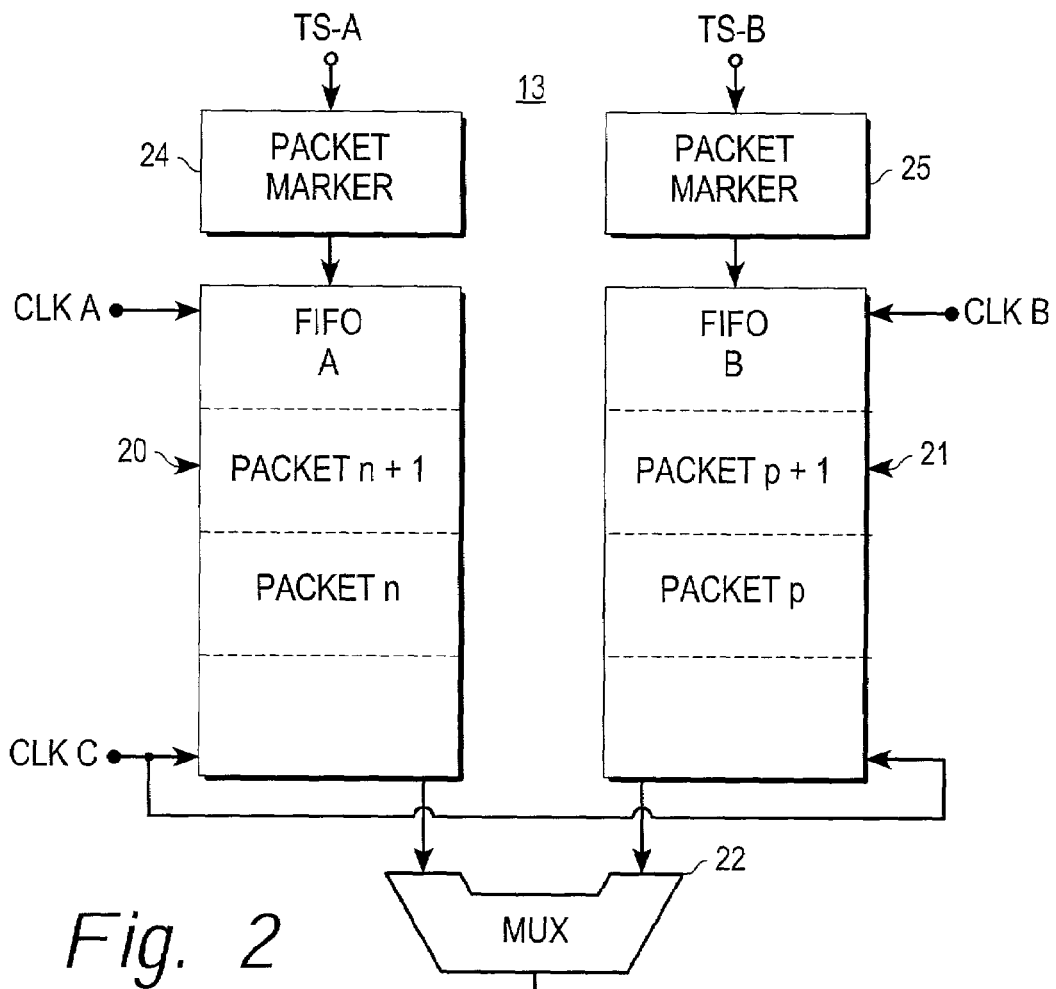
FIG. 2 shows in greater detail the construction of the multiplexer mechanism (MUX) of FIG. 1.

Referring to FIG. 2, there is shown a representative form of construction for the multiplexer mechanism 13 of FIG. 1. As shown in FIG. 2, multiplexing mechanism 13 includes a first FIFO (First-In-First-Out) storage mechanism 20 for receiving signal packets in a first signal transport stream, in this case, transport stream TS-A, and a second FIFO (First-In-First-Out) storage mechanism 21 for receiving signal packets in a second signal transport stream, in this case, transport stream TS-B. Each of FIFO's 20 and 21 is sized to hold approximately two packets of data.

The multiplexing mechanism 13 also includes FIFO readout circuitry 22 coupled to the outputs of the first and second FIFO storage mechanisms for reading signal packets from the first and second FIFO's in an interleaved manner for producing the combined signal transport stream TS-C.

The multiplexing mechanism 13 further includes a first packet marker mechanism 24 for receiving the packets in the first transport stream TS-A and changing the coding of the sync byte in each packet to a first unique identifier (UI) value before it is supplied to the first FIFO storage mechanism 20. Multiplexer 13 further includes a second packet marker mechanism 25 for receiving the packets in the second transport stream TS-B and changing the coding of the sync byte in each packet to a second unique identifier (UI) value before it is supplied to the second FIFO storage mechanism 21.

Figure 3:
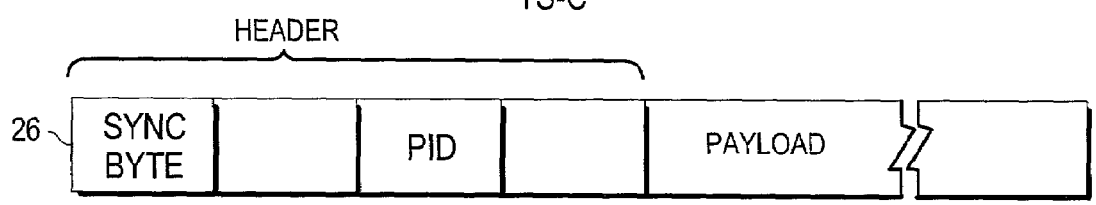
FIG. 3 shows the format of a typical signal packet and the manner in which it is modified by a packet marker mechanism of FIG. 2.
Figure 3:
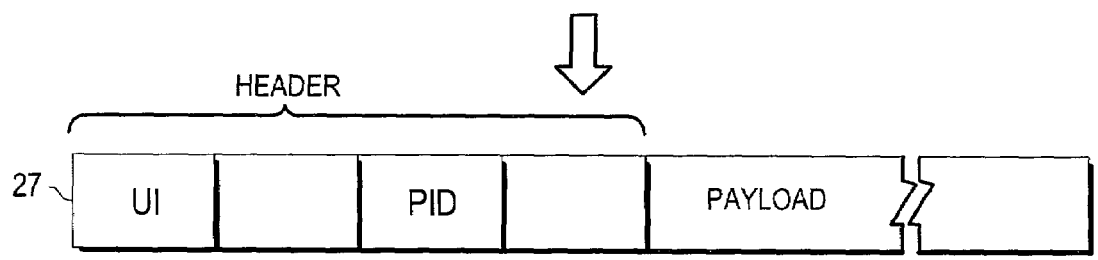

FIG. 3 shows the format of a typical MPEG-2 signal packet and indicates the manner in which it is modified by a packet marker mechanism in FIG. 2. The upper format 26 shows the format of the packet in the incoming transport stream and the lower format 27 shows the format of the packet after it has been processed by the packet marker mechanism. Each incoming packet has a length of 188 bytes and includes a header portion and a payload portion. The header portion is a few bytes in length and contains various control information. The first byte is the sync byte which marks the beginning of the packet. In MPEG-2, it has a standard code value of hexadecimal "47". The header also contains a plural-bit packet identification code or PID which identifies the elementary signal stream from which the packet was derived. The payload portion carries the video or audio data and occupies the remainder of the packet.

Figures 4, 5:
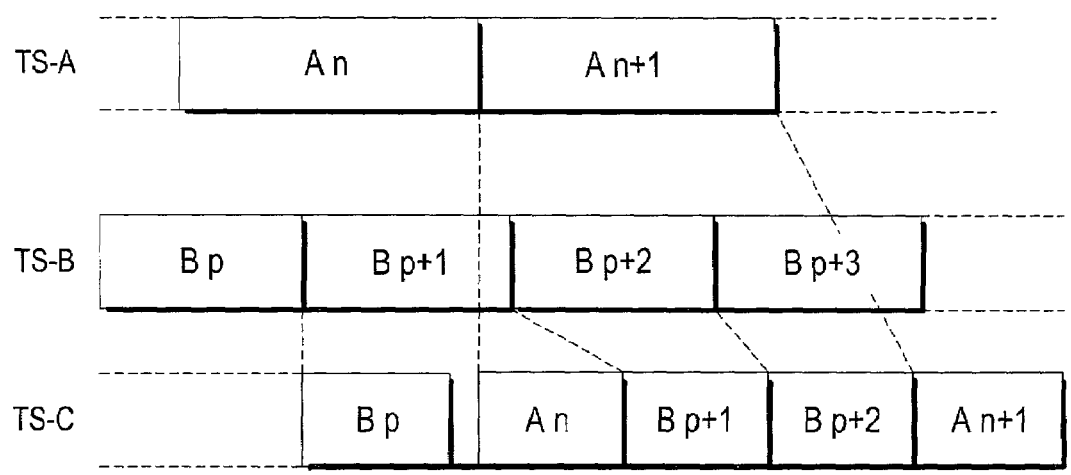
FIG. 4 is a table of typical unique identifier (UI) codes which may be inserted into the sync bytes of the signal packets of different receiver signal transport streams.
FIG. 5 is a timing diagram used in explaining the operation of the multiplexer mechanism of FIG. 2.

FIG. 4 is a table of representative unique identifier (UI) codes which may be inserted into the sync bytes of the signal packets for different received signal transport streams. "0x47" denotes hexadecimal number "47", "0x46" denotes hexadecimal number "46", and so forth. As indicated by the table of FIG. 4, the receiving system 10 may have more than two channels (for example, eight channels A-H) and, hence more than two digital TV receiver mechanisms. For more than two channels, the multiplexer mechanism 13 will have a number of FIFO storage mechanisms equal to the number of receiver channels (for example, eight FIFO's for the case of eight channels). For sake of simplicity, only two channels will be described herein. Any additional channels will be constructed and operated in a manner similar to those described herein.

The UI codes shown in FIG. 4 are by way of examples only. Other code values may be used, so long as they don't fall within the range of code values used for data bytes. Another point to note is that the UI code shown for receiver A (receiver mechanism 11) is hexadecimal "47". This is the same as the standard MPEG-2 sync byte code value. Hence, in this particular case only, no packet marker is needed for the transport stream TS-A because the standard sync byte code is also used as the UI value. For sake of generality, however, a packet marker is described herein for the TS-A transport stream to cover the case where a different UI value is used for the TS-A stream.

One reason for tagging each incoming packet with a unique UI code is to enable the security mechanism 14 to distinguish packets from different transport streams which may have been assigned the same PID packet identification codes.

FIG. 5 is a timing diagram showing a representative operation of the multiplexer mechanism 13 of FIG. 2. The upper segment TS-A shows two successive packets An and An+1 in the incoming TS-A transport stream. The middle segment TS-B shows several successive packets Bp, Bp+1, Bp+2 and Bp+3 in the incoming TS-B transport stream. The lower segment shows the resulting interleaved packets appearing in the combined transport stream TS-C appearing at the output of the FIFO readout circuitry 22. As indicated in FIG. 5, the two transport streams TS-A and TS-B may have two different bit rates. The TS-A stream may have a bit rate of, for example, 27.0 Mbps (megabits per second) and the TS-B stream a bit rate of, for example, 38.8 Mbps. These bit rates determine the rates at which the packets are read into the FIFO storage mechanisms. As indicated in FIG. 2, the read in of the TS-A packets is synchronized by a timing signal CLK A which corresponds to the bit rate for the TS-A transport stream and the read in of the TS-B packets is synchronized by a different timing signal CLK B which corresponds to the bit rate for the TS-B transport stream. Packets are read out of the FIFO storage mechanisms 20 and 21 by a third timing signal CLK C having yet another frequency. In order to avoid system saturation, the CLK C bit rate must be greater than the sum of the CLK A and CLK B bit rates. For the example rates given above, the CLK C bit rate may have a value of, for example, 81.0 Mbps.

In order to minimize undesired jitter in the combined transport stream TS-C, some important conditions should be observed. A first condition is that each signal packet should be read out of its FIFO only after it is fully resident in its FIFO. Another condition is that the packet read out should be switched to a different FIFO after each packet is read out, provided a different FIFO has a packet ready for reading. In other words, a second packet should not be immediately read from the same FIFO storage mechanism unless it has a packet ready and none of the other FIFO storage mechanisms have packets ready. This provides the maximum interleaving of packets from the different FIFO's. As indicated, a packet is ready for read out when it is fully resident in its FIFO. The observance of these conditions is shown in the timing diagram of FIG. 5. Also, as is evident from FIG. 5, packets are read out at a much higher rate than they are read in.

Figure 6:
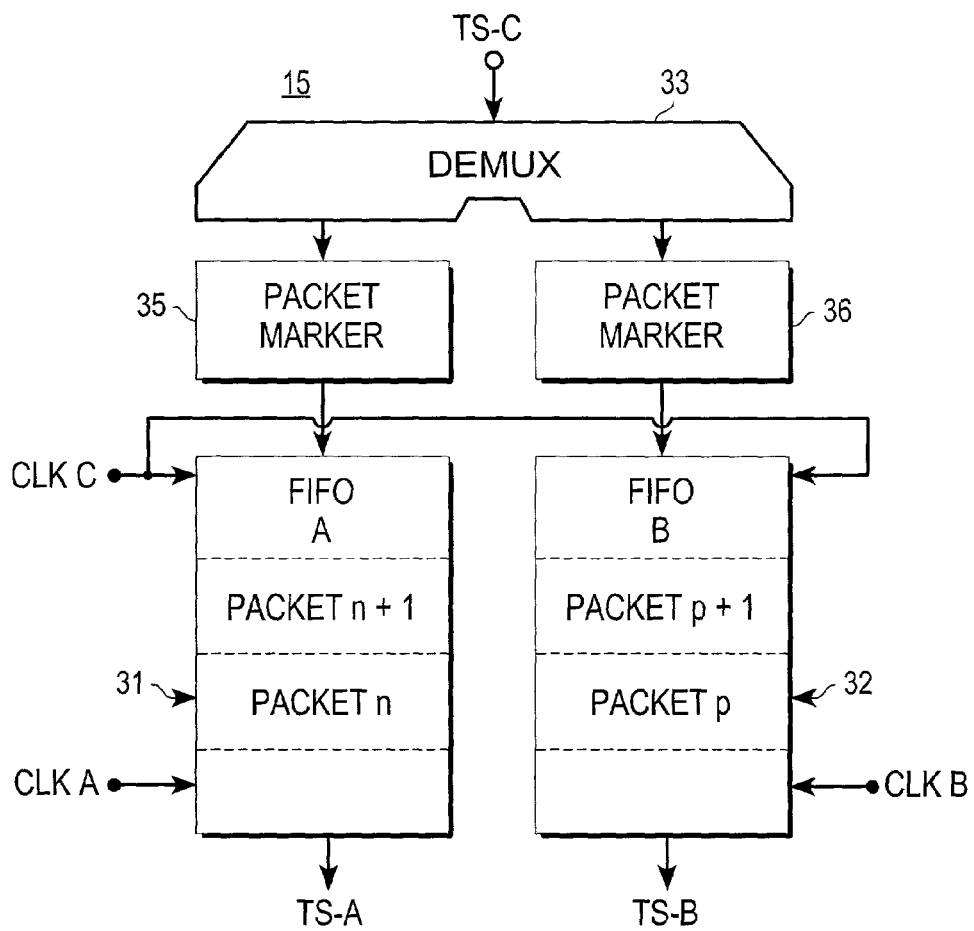
FIG. 6 shows in greater detail the construction of the demultiplexer mechanism (DEMUX) of FIG. 1.

Referring now to FIG. 6 of the drawings, there is shown a representative form of construction for the demultiplexer (DEMUX) mechanism 15 of FIG. 1. As shown in FIG. 6, the demultiplexing mechanism 15 includes a first FIFO storage mechanism 31 for supplying signal packets for a first program (e.g., TS-A program) to a utilization mechanism (e.g., decoder 16, display control 18 and television display 19 of FIG. 1) for utilization thereby. The demultiplexer mechanism 15 further includes a second FIFO storage mechanism 32 for supplying signal packets for a second program (e.g., TS-B program) to a utilization mechanism (e.g., decoder 17, display control 18 and television display 19 of FIG. 1) for utilization thereby. If more than two program transport streams are contained in the combined TS-C program transport stream being demultiplexed, then additional FIFO storage mechanisms will be included such that the total number of FIFO storage mechanisms will be equal to the number of separate programs streams contained in the combined TS-C program stream.

The demultiplexing mechanism 15 also includes FIFO read-in circuitry 33 for separating signal packets for different programs (TS-A and TS-B) from a combined program transport stream (TS-C) and transferring packets for a first program (TS-A) to the first FIFO storage mechanism 31 and packets for a second program (TS-B) to the second FIFO storage mechanism 32.

The demultiplexing mechanism 15 further includes a first packet marker mechanism 35 for restoring the coding of the packet sync bytes for a first of the programs (TS-A) to a normal sync code value (hexadecimal "47" for MPEG-2) before they are transferred to the first FIFO storage mechanism 31. Demultiplexer 15 also includes a second packet marker mechanism 36 for restoring the coding of the packet sync bytes for a second of the programs (TS-B) to a normal sync code value (e.g., hexadecimal "47") before they are transferred to the second FIFO storage mechanism 32. If more than two channels are being handled, each additional channel will have a packet marker for its FIFO. No packet marker is needed for the case of a channel wherein the incoming sync bytes already have the correct sync code value.

Figure 7:
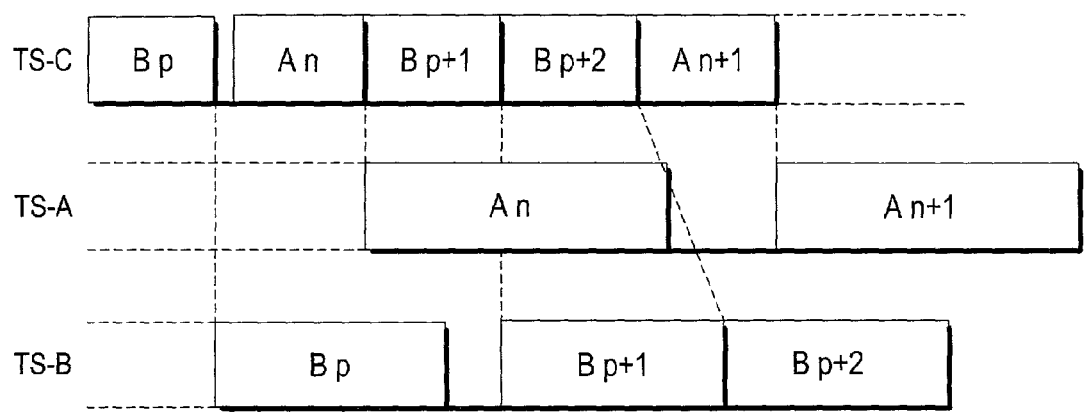
FIG. 7 is a timing diagram used in explaining the operation of the demultiplexer mechanism of FIG. 6.

FIG. 7 is a timing diagram showing a representative operation of the demultiplexer mechanism 15 of FIG. 6. The upper line TS-C of FIG. 7 shows several consecutive packets in the combined transport stream TS-C received by the FIFO read-in circuitry 33. The middle TS-A line shows the corresponding demultiplexed TS-A packets appearing at the output of FIFO 31. The lower TS-B line shows the demultiplexed TS-B packets appearing at the output of the second FIFO 32. As indicated, each packet is transferred from its FIFO to its utilization mechanism only after the packet is fully resident in its FIFO.

The FIFO read-in circuitry 33 uses the unique identifier (UI) codes in the packet sync bytes to determine the particular FIFO to which the TS-C packets are transferred. Assuming the UI values shown in FIG. 4 are used, then if the sync byte of the packet being received has a code value of hexadecimal "47", it is transferred to the first FIFO 31. If, on the other hand, the sync byte has a code value of hexadecimal "46", the packet is transferred to the second FIFO 32. Thus, the UI sync byte codes are used to separate the two sets of packets which are interleaved in the combined transport stream TS-C.

The incoming packets are clocked into FIFO's 31 and 32 by a timing signal CLK C having the same bit rate as the incoming transport stream TS-C. The TS-A packets are clocked out of FIFO 31 by a timing signal CLK A having the same bit rate as the TS-A transport stream received by the TS-A receiver 11 of FIG. 1. The TS-B packets, on the other hand, are clocked out of the second FIFO 32 by a timing signal CLK B having the same bit rate as the TS-B transport stream received by the TS-B receiver 12 of FIG. 1.

Figure 8A:
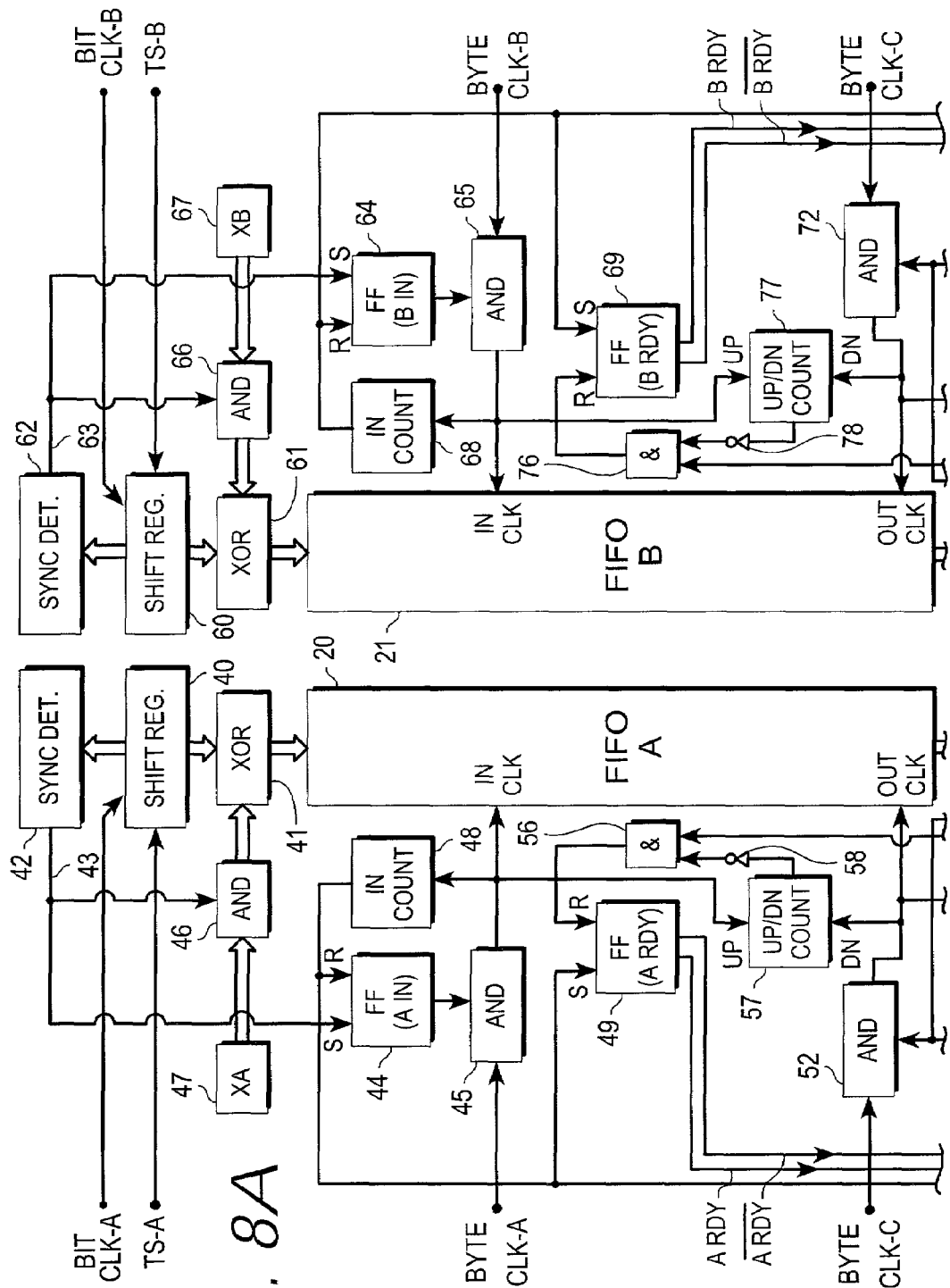
FIG. 8 comprised of FIGS. 8A and 8B, is a detailed logic diagram for the multiplexer mechanism of FIG. 2.
Figure 8B:
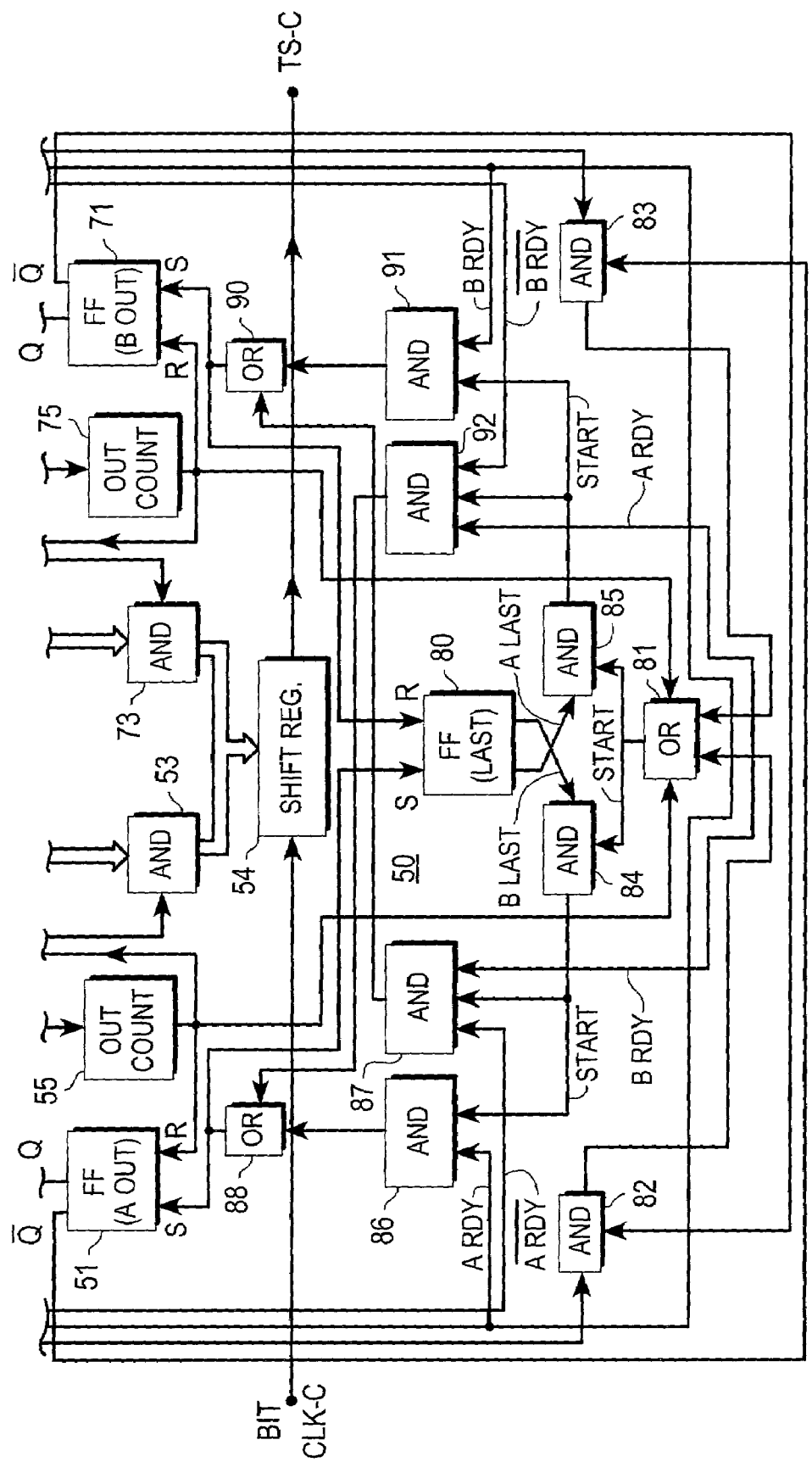

Description of FIG. 8 Multiplexer

Referring now to FIG. 8 of the drawings, there is shown a detailed logic circuit diagram for a representative embodiment of circuitry suitable for use as the multiplexer mechanism 13 of FIG. 2. The two FIFO storage mechanisms are identified as 20 and 21, the same as in FIG. 2. The incoming transport stream TS-A is supplied to the serial input of a byte-sized shift register 40 which functions an a serial-to-parallel converter. The transport stream bits are clocked into shift register 40 by a timing signal BIT CLK A having the same bit rate as the TS-A transport stream. When each transport stream byte is resident in shift register 40, it is transferred in a parallel manner from the shift register 40 to the A-signal FIFO storage mechanism 20 by way of an EXCLUSIVE OR (XOR) circuit 41. The contents of shift register 40 are monitored by a sync byte detector 42 which produces a control pulse on line 43 when a packet sync byte is detected. This sets a flip-flop circuit 44 (herein referred to as the "A-in" control flip-flop) to a set condition. This enables an AND circuit 45 to pass BYTE CLK A timing signals to the clock input of A FIFO 20. These BYTE CLK A clock pulses occur at the same rate as the bytes in the TS-A transport stream and serve to clock one byte at a time into FIFO 20.

The control pulse from sync byte detector 42 also enables an AND circuit 46 which controls the operation of EXCLUSIVE OR circuit 41. Most of the time, AND circuit 46 is disabled and all binary zeros (hexadecimal number "00") are supplied by AND circuit 46 to EXCLUSIVE OR circuit 41. In such case, EXCLUSIVE OR circuit 41 merely passes the contents of shift register 40 on to FIFO 20 without change. The enabling of AND circuit 46 at detection of a sync byte causes a control number to be transferred from an XA register 47 via AND circuit 46 to XOR 41. This control number causes XOR 41 to change the code value of the packet sync byte then resident in shift register 40 to the desired unique identifier (UI) code before it is supplied to FIFO 20. For the case where no change is required in the sync code value, the control number in XA register 47 is set to a value of hexadecimal "00". As an alternative, XOR 41, AND circuit 46 and XA register 47 can be omitted and the parallel output of shift register 40 connected directly to the input of FIFO 20.

The BYTE CLK A pulses passing through AND circuit 45 are counted by an "In Count" counter 48 which produces an output pulse when 188 BYTE CLK A pulses have been counted. This event signifies that one complete packet (188 bytes) has been loaded into the A FIFO 20. The output pulse from counter 48 does several things. It resets A In control flip flop 44 to discontinue the supplying of BYTE CLK A read-in pulses to FIFO 20. A IN flip flop 44 will be immediately reset just as soon as the next packet sync byte is detected. The output pulse from counter 48 also sets an A READY indicator flip flop 49 to provide an indication that a complete packet is resident in FIFO 20 and ready to be read out.

The output pulse from counter 48 is also supplied to control circuitry 50 which controls the selection of the FIFO (either FIFO 20 or FIFO 21) from which a packet is read. If conditions are right, the control circuitry 50, in response to the output pulse from counter 48, will supply a START pulse to an A OUT control flip flop 51 to place same in a set condition to commence the read out of a packet from A FIFO 20. The setting of flip flop 51 enables an AND circuit 52 to pass BYTE CLK C timing pulses to the OUT CLOCK terminal of A FIFO 20 to cause the read out of packet bytes from FIFO 20. These BYTE CLK C pulses occur at a rate corresponding to the desired byte rate in the combined transport stream TS-C.

The setting of A OUT control flip flop 51 also enables an AND circuit 53 to pass packet bytes in a parallel manner from FIFO 20 to a byte-sized shift register 54 which functions as a parallel-to-serial converter. The bits in shift register 54 are shifted out in a serial manner by BIT CLK C timing pulses which are supplied to the shift control terminal of shift register 54. The bits shifted out of shift register 54 form the desired combined transport stream TS-C. The BIT CLK C timing pulses have a pulse rate corresponding to the desired bit rate for the combined transport stream TS-C. As mentioned, this TS-C bit rate is greater than the sum of the TS-A and TS-B bit rates.

The BYTE CLK C pulses passed by AND circuit 52 are counted by an OUT COUNTER 55 to count the number of bytes which have been read out of FIFO 20. When a complete packet (188 bytes) has been read out, OUT COUNTER 55 produces an output pulse which resets the A OUT control flip flop 51. This, in turn, disables the BYTE CLK C AND circuit 52 and the FIFO readout AND circuit 53 to discontinue the readout of packet bytes from FIFO 20. The output pulse from OUT counter 55 is also supplied by way of AND circuit 56 to reset the A READY indicator flip flop 49, provided the A FIFO 20 does not at that time have a complete packet residing therein. This latter condition is determined by an up/down counter 57 which monitors the number of bytes resident in FIFO 20. If the number of resident bytes is 188 or greater, up/down counter 57 outputs a binary one level signal which is supplied to inverter circuit 58 to disable AND circuit 56. In this manner, the A READY indicator flip flop 49 is not reset if a complete packet happens to be resident in FIFO 20.

A similar set of circuits are provided for the B FIFO 21. More particularly, the incoming TS-B transport stream is supplied to the serial input of a shift register 60 which, in turn, supplies the TS-B bytes in a parallel manner by way of an EXCLUSIVE OR circuit 61 to the input of B FIFO 21. BIT CLK B has the same bit rate as does the TS-B transport stream. Sync byte detector 62 produces an output pulse on line 63 when a packet sync byte is detected in shift register 60. This pulse on line 63 set a B IN control flip flop 64. This enables AND circuit 65 to pass BYTE CLK B read-in pulses to the in clock terminal of B FIFO 21.

The output pulse from sync byte detector 62 also momentarily enables AND circuit 66 to pass a control number from XB register 67 to the XOR circuit 61 to change the code value of the sync byte to the desired unique indicator (UI) value. Assuming, for example, that the sync byte code is to be changed from the standard hexadecimal "47" to a unique indicator code value of hexadecimal "46", then the control number from XB register 67 should have a value of hexadecimal "01". This changes the "47" to a "46" before the sync byte is stored in B FIFO 21.

The number of bytes read into B FIFO 21 is counted by IN counter 68. When a complete packet (188 bytes) has been read into FIFO 21, counter 68 produced an output pulse which resets the B IN control flip flop 64. This output pulse also sets a B READY indicator flip flop 69 to indicate that B FIFO 21 contains a complete packet and, hence is ready for reading. This output pulse from counter 68 is also supplied to the readout control circuitry 50 for supplying a start pulse to B OUT control flip flop 71 to set flip flop 71, provided certain conditions exist.

The setting of B OUT control flip flop 71 enables AND circuit 72 to supply BYTE CLK C readout pulses to the OUT CLK terminal of B FIFO 21. This setting also enables AND circuit 73 so as to connect the output of B FIFO 21 to the parallel input of output shift register 54. The serial output from output shift register 54 provides the TS-B packet portions for the combined transport stream TS-C.

The number of bytes read out of B FIFO 21 are counted by B OUT counter 75. When a complete packet has been read out, OUT counter 75 resets the B OUT control flip flop 71. It also resets the B READY indicator flip flop 69 by way of AND circuit 76, provided the up/down counter 77 is not showing that a complete packet is ready in the B FIFO 21. If a complete packet is ready, B READY indicator flip flop 69 is not reset.

The readout control circuitry 50 controls the switching of the multiplexer output back and forth between A FIFO 20 and B FIFO 21. Control circuitry 50 switches to a different FIFO after each packet is read out, except that a second packet may be read from the same FIFO if it has a packet ready and the other FIFO doesn't have a packet ready. "Packet ready" means that a complete packet is resident in the FIFO. The packet ready status for A FIFO 20 is indicated by a set condition of the A READY indicator flip flop 49. The packet ready status for B FIFO 21 is indicated by a set condition of the B READY indicator flip flop 69.

A major element in the readout control circuitry 50 is a LAST USED FIFO indicator flip flop 80. The set state of flip flop 80 indicates that A FIFO 20 was the last FIFO to supply an output packet. The reset state of flip flop 80 indicates that B FIFO 21 was the last FIFO to supply an output packet.

Any one of four different events can start the outputting of a new packet. These events are associated with the four inputs to an OR circuit 81. These four events are:

(1) A FIFO 20 has just finished receiving a new packet and B FIFO 21 is not in the process of reading out a packet;

(2) A FIFO 20 has just finished reading out a complete packet;

(3) B FIFO 21 has just finished reading in a complete packet and A FIFO 20 is not in the process of reading out a packet; and (4) B FIFO 21 has just finished reading out a complete packet.

The first event involves an AND circuit 82 which receives the output pulse from A FIFO IN counter 48 upon completion of the read in of a complete packet into A FIFO 20. The second input of AND circuit 82 is connected to the reset output of B OUT control flip flop 71. This output is high when B FIFO 21 is not in the process of reading out a packet. This enables AND circuit 82 to pass the output pulse from counter 48 to OR circuit 81 to produce a START pulse at the output of OR circuit 81.

The second event is represented by the occurrence of a pulse at the output of OUT counter 55 for A FIFO 20. This pulse is supplied to a second input of OR circuit 81 to also produce a START pulse.

The third event involves an AND circuit 83 which has one input connected to the output of B FIFO IN COUNTER 68 and a second input connected to the reset output of A OUTPUT control flip flop 51. The output of AND circuit 83 is connected to a third input of START pulse OR circuit 81.

The fourth event is represented by the occurrence of a pulse at the output of OUT counter 75 for B FIFO 21. This pulse is supplied to the fourth input of START pulse OR circuit 81.

When a START pulse appears at the output of OR circuit 81, it is supplied to a pair of AND circuits 84 and 85 which are controlled by the LAST USED FIFO indicator flip flop 80. If B FIFO 21 was the last FIFO to supply an output packet, the START pulse is supplied by way of AND circuit 84 to a pair of AND circuits 86 and 87. If the A FIFO 20 is ready (has a complete packet resident therein), AND circuit 86 passes the START pulse by way of an OR circuit 88 to the set input of A OUT control flip flop 51 to commence the read out of a packet from A FIFO 20. If, on the other hand, A FIFO 20 is not ready but B FIFO 21 is ready, then the other AND circuit 87 passes the START pulse by way of an OR circuit 90 to the set input of B OUT control flip flop 71 to start the read out of a packet from B FIFO 21. In this way, a second packet may be read from B FIFO 21 immediately following the reading of the preceding packet from B FIFO 21.

If A FIFO 20, was the last FIFO to supply an output packet, then the LAST USED FIFO indicator flip flop 80 is in a set state. In this case, a START pulse at the output of START pulse OR circuit 81 is supplied by way of AND circuit 85 to a pair of AND circuits 91 and 92. If B FIFO 21 is ready, the START pulse is supplied by AND circuit 91 and OR circuit 90 to the set input of the B OUT control flip flop 71 to commence the read out of a packet from B FIFO 21. If, on the other hand, B FIFO 21 is not ready and A FIFO 20 is ready, then the START pulse is supplied instead by AND circuit 92 and OR circuit 88 to the set input terminal of A OUT control flip flop 51 to start the read out of a packet from A FIFO 20.

The setting and resetting of the LAST USED FIFO indicator flip flop 80 is accomplished by the START pulses which set the A OUT and B OUT control flip flops 51 and 71. Any START pulse which is supplied to A OUT flip flop 51 is also supplied to the set input of indicator flip flop 80 to indicate that A FIFO 20 was the last used FIFO. Any START pulse supplied to B OUT control flip flop 71 is also supplied to the reset input terminal of the LAST USED indicator flip flop 80 to indicate that B FIFO 21 was the last used FIFO.

Figure 9:
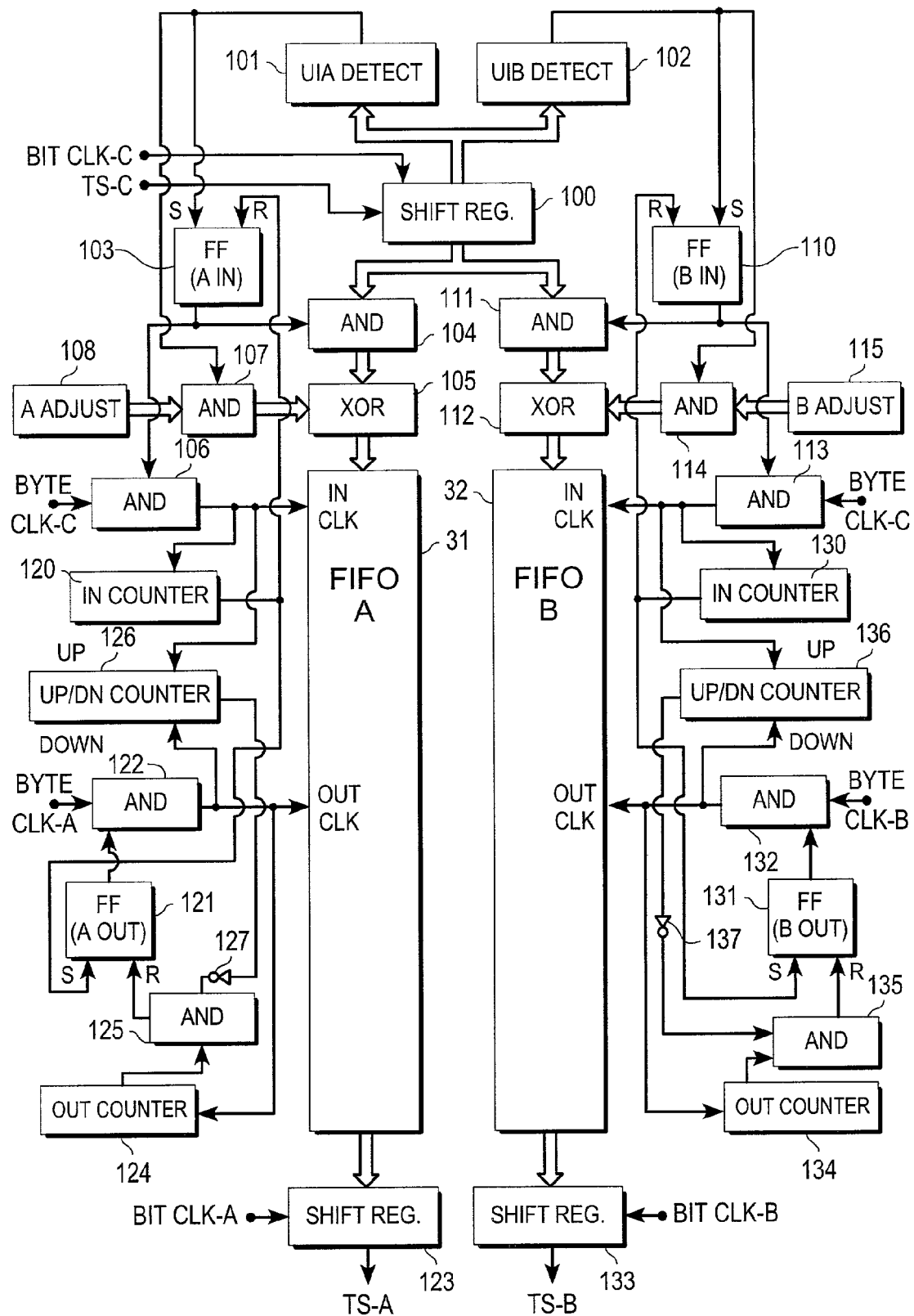
FIG. 9 is a detailed logic diagram for the demultiplexer mechanism of FIG. 6.

Description of FIG. 9 Demultiplexer

Referring now to FIG. 9 of the drawings, there is shown a detailed logic circuit diagram for a representative embodiment of circuitry suitable for use as the demultiplexer 15 of FIG. 6. The two FIFO storage mechanisms are identified as 31 and 32, the same as in FIG. 6. As shown in FIG. 9, the incoming combined transport stream TS-C is supplied to the serial input of a shift register 100. The transport stream bits are shifted into shift register 100 by a timing signal BIT CLK C having the same bit rate as the TS-C transport stream. The contents of shift register 100 are monitored by a pair of unique indicator (UI) byte detectors 101 and 102. Detector 101 is looking for a byte having the UI code assigned to the TS-A packets and detector 102 is looking for a byte having the UI code assigned to the TS-B packets.

When UI-A detector 101 detects the occurrence of a UI code byte for the TS-A packets (e.g., hexadecimal "47"), it produces an output pulse which is supplied to the set input terminal of an A IN control flip flop 103 to commence the read in to A FIFO 31 of the 188-byte TS-A packet, the beginning byte of which is the detected UI code byte. The set condition in control flip flop 103 enables an AND circuit 104 to transfer the incoming packet bytes from shift register 100 to the input of A FIFO 31 by way of an EXCLUSIVE OR circuit 105. The set condition in control flip flop 103 also enables an AND circuit 106 to pass BYTE CLK C read in pulses to the IN CLK terminal of A FIFO 31.

The output pulse produced by the A packet UI detector 101 also momentarily enables an AND circuit 107 to pass a control number from an A adjust register 108 to the XOR circuit 105 to change the code value in the UI byte back to the standard sync byte code value (e.g., hexadecimal "47"). If no change is needed, that is, if the UI value is the same as the standard sync byte value, then A adjust register 108 passes a control number of hexadecimal "00" to XOR 105 and no change is made.

When UI-B detector 102 detects the occurrence of a UI code byte for the TS-B packets (e.g., hexadecimal "46"), it produces an output pulse which is supplied to the set input terminal of a B IN control flip flop 110 to commence the read in to B FIFO 32 of the 188-byte TS-B packet, the beginning byte of which is the detected UI code byte. The set condition in control flip flop 110 enables an AND circuit 111 to transfer the incoming packet bytes from shift register 100 to the input of B FIFO 32 by way of an EXCLUSIVE OR circuit 112. The set condition in control flip flop 110 also enables an AND circuit 113 to pass BYTE CLK C read in pulses to the IN CLK terminal of B FIFO 32.

The output pulse produced by the B packet UI detector 102 also momentarily enables an AND circuit 114 to pass a control number from a B adjust register 115 to the XOR circuit 112 to change the code value in the UI byte (e.g., hexadecimal "46") to the standard sync byte code value (e.g., hexadecimal "47"). If the UI code is hexadecimal "46", for example, then B adjust register 115 passes a control number of hexadecimal "01" to XOR 112 to change the code to the standard sync byte code value of hexadecimal "47".

The number of packet bytes read into A FIFO 31 is monitored by an IN counter 120 which counts the read in clock pulses supplied to the IN CLK terminal of A FIFO 31. When a complete 188-byte packet has been read into A FIFO 31, IN counter 120 produces an output pulse which is supplied to the set input terminal an A OUT control flip flop 121 to commence the read out of packet bytes from A FIFO 31. The set condition in control flip flop 121 enables an AND circuit 122 to supply BYTE CLK A pulses to the OUT CLK terminal of A FIFO 31. These BYTE CLK A pulses have a pulse rate which corresponds to the desired byte rate for the TS-A transport stream. The bytes read out of A FIFO 31 are supplied one at a time to the parallel input of an output shift register 123. The desired signal transport stream TS-A is produced at the serial output terminal of shift register 123 as the shift register bits are shifted out by BIT CLK A timing pulses. BIT CLK A has the same bit rate as the desired bit rate for transport stream TS-A.

An OUT counter 124 monitors the number of bytes read out of A FIFO 31 by counting the number of BYTE CLK A read out pulses supplied to A FIFO 31. When 188 pulses are counted, OUT counter 124 produces an output pulse which is supplied by way of an AND circuit 125 to reset the A OUT control flip flop 121, provided A FIFO 31 doesn't have another complete packet resident therein. Resetting control flip flop 121 disables AND circuit 122 to discontinue the read out of bytes from A FIFO 31.

The number of bytes resident in A FIFO 31 is monitored by an UP/DOWN counter 126 which keeps track of the bytes entering and leaving A FIFO 31. If the count in UP/DOWN counter 126 is equal to or greater than 188 bytes, counter 126 produces a binary one level output signal which is inverted by an inverter circuit 127 to disable AND circuit 125. When AND circuit 125 is disabled, the A OUT control flip flop 121 is not reset and BYTE CLK A continues to read bytes out of A FIFO 31.

The number of packet bytes read into B FIFO 32 is monitored by an IN counter 130 which counts the read in clock pulses supplied to the IN CLK terminal of B FIFO 32. When a complete 188-byte packet has been read into B FIFO 32, IN counter 130 produces an output pulse which is supplied to the set input terminal an B OUT control flip flop 131 to commence the read out of packet bytes from B FIFO 32. The set condition in control flip flop 131 enables an AND circuit 132 to supply BYTE CLK B pulses to the OUT CLK terminal of B FIFO 32. These BYTE CLK B pulses have a pulse rate which corresponds to the desired byte rate for the TS-B transport stream. The bytes read out of B FIFO 32 are supplied one at a time to the parallel input of an output shift register 133. The desired signal transport stream TS-B is produced at the serial output terminal of shift register 133 as the shift register bits are shifted out by BIT CLK B timing pulses. BIT CLK B has the same bit rate as the desired bit rate for transport stream TS-B.

An OUT counter 134 monitors the number of bytes read out of B FIFO 32 by counting the number of BYTE CLK B read out pulses supplied to B FIFO 32. When 188 pulses are counted, OUT counter 134 produces an output pulse which is supplied by way of an AND circuit 135 to reset the B OUT control flip flop 131, provided B FIFO 32 doesn't have another complete packet resident therein. Resetting control flip flop 131 disables AND circuit 132 to discontinue the read out of bytes from B FIFO 32.

The number of bytes resident in B FIFO 32 is monitored by an UP/DOWN counter 136 which keeps track of the bytes entering and leaving B FIFO 32. If the count in UP/DOWN counter 136 is equal to or greater than 188 bytes, counter 136 produces a binary one level output signal which is inverted by an inverter circuit 137 to disable AND circuit 135. When AND circuit 135 is disabled, the B OUT control flip flop 131 is not reset and BYTE CLK B continues to read bytes out of B FIFO 32.

As seen from the foregoing, the interleaved packets of the combined transport stream represented, for example, by the upper TS-C segment in FIG. 7, are separated out from the combined stream and stored into their respective ones of FIFO's 31 and 32 of FIG. 9. The TS-A and TS-B segments of FIG. 7 show the separated packets as they are read out of their respective FIFO's 31 and 32.

While the foregoing examples have described the invention for the case where it is desired to simultaneously process multiple transport streams by one and the same television signal access control security mechanism, it should be recognizes that the novel packet marking mechanism of the present invention can also be applied to other situations where it is desired to simultaneously process multiple transport streams by other types of digital signal processing apparatus. In particular, packet marker apparatus is provided for uniquely tagging the packets in the different transport streams by changing the coding of the packet sync bytes in the different streams to different unique values. A multiplexer mechanism is provided for interleaving the tagged packets from the different transport streams and supplying the resulting interleaved stream to the desired signal processing apparatus for processing thereby. After processing, the processed combined stream is supplied to a demultiplexer mechanism which uses the unique sync byte codes to separate the processed packets into separate transport streams. Packet "demarker" apparatus is used to change the unique sync byte codes back to the standard sync byte code. In this manner, one and the same signal processing apparatus can be used to simultaneously process multiple transport streams.

While there have been described what are at present considered to be preferred embodiments of this invention, it will be obvious to those skilled in the art that various changes and modifications may be made therein without departing from the invention and it is, therefore, intended to cover all such changes and modifications as come within the true spirit and scope of the invention.

What is claimed is:

1. A television receiving system comprising:
    a plurality of television receiver mechanisms for receiving a plurality of separate television program signals for producing a plurality of input signal streams;
    a multiplexer mechanism coupled to the television receiver mechanisms for uniquely marking each input signal stream and multiplexing the marked input signal streams into a single combined signal stream;
    a security mechanism receiving the combined signal stream and responsive to the access control of the single combined signal stream and producing an access-allowed combined signal stream;
    a demultiplexer mechanism coupled to the security mechanism for receiving the access-allowed combined signal stream and detecting the unique marking specific to each input signal stream, demultiplexing the access-allowed single combined signal stream into each access allowed input signal stream according to their respective marking, restoring the initial marking into each access-allowed input signal stream, and producing separate television program signals corresponding to the each input signal streams received by the receiver mechanisms; and
    circuitry responsive to at least one of the access-allowed input signal stream for supplying image signals to a television display mechanism for enabling same to produce television images.

2. The television receiving system of claim 1, in which the input signal stream is formed by a plurality of signal packets each having a synchronisation byte, wherein the multiplexer comprises means to modify the synchronisation byte of the signal packet according to the input signal stream considered and means to replace it with the unique marker pertaining to said input signal stream.

3. The television receiving system of claim 1, wherein the demultiplexer comprises means to retrieve the modified synchronisation byte of the signal packets and means to restore the initial value of the synchronisation byte of each signal packet while assigning the signal packet to the corresponding access-allowed input signal stream.

4. The television receiving system of claim 1, wherein the multiplexer mechanism comprises a first FIFO storage mechanism for receiving signal packets from a first input signal stream; a second FIFO storage mechanism for receiving signal packets from a second input signal stream; and FIFO readout circuitry coupled to the outputs of the first and second FIFO storage mechanisms for reading signal packets from the first and second FIFO storage mechanisms in an interleaved manner for producing the combined signal stream.

5. The television receiving system of claim 4, wherein the FIFO readout circuitry includes control circuitry for enabling each signal packet to be read out only after the packet is fully resident in its FIFO storage mechanism.

6. The television receiving system of claim 1, wherein the input signal streams is in the format of Transport Stream TS.

7. The television receiving system of claim 2, wherein the signal packets are in the MPEG format.

8. Method to control access of a plurality of separate television program signals comprising the steps of:
    receiving a plurality of television program signals for producing a plurality of input signal streams;
    marking uniquely each input signal stream and multiplexing the marked input signal streams into a single combined signal stream;
    transmitting the combined signal stream to a conditional access module in charge of the access control of the combined signal stream and producing an access allowed combined signal stream;
    receiving the access-allowed combined signal stream from the conditional access module;
    detecting the unique marking specific to each input signal stream and demultiplexing the access-allowed single combined signal stream into each access-allowed input signal stream according to their respective marking;
    restoring the initial marking into each access-allowed input signal stream;
    producing separate television program signals corresponding to the each access-allowed input signal streams; and
    supplying the separate television image to television display mechanism to produce television images.

9. The method of claim 8, in which the input signal stream is formed by a plurality of signal packets each having a synchronisation byte, wherein the method further comprises the steps of:
    modifying, by the multiplexer, the synchronisation byte of the signal packet according to the input signal stream considered; and
    replacing the synchronisation byte with the unique marker pertaining to said input signal stream.

10. The method of claim 8, wherein it further comprises the steps of
    retrieving by the demultiplexer the modified synchronisation byte of the signal packets; and
    restoring the initial value of the synchronisation byte of each signal packet while assigning the signal packet to the corresponding access-allowed input signal stream.

11. The method of claim 9, wherein the multiplexing step further comprises a FIFO storage step to store signal packets while signal packets from another input signal stream is producing the combined signal stream.

12. The method of claim 8, wherein the input signal streams is in the format of Transport Stream TS.

13. The method of claim 8, wherein the signal packets are in the MPEG format.

* * * * *